(12) United States Patent
Matera et al.

(10) Patent No.: US 7,771,045 B2
(45) Date of Patent: Aug. 10, 2010

(54) POLARIZED EYEWEAR

(75) Inventors: Pasquale Matera, Plainview, NY (US); David Kessler, Rochester, NY (US)

(73) Assignee: SOL-Grid, LLC, Rochester, NY (US)

(*) Notice: Subject to any disclaimer, the term of this patent is extended or adjusted under 35 U.S.C. 154(b) by 5 days.

(21) Appl. No.: 12/248,342

(22) Filed: Oct. 9, 2008

(65) Prior Publication Data

US 2010/0091236 A1 Apr. 15, 2010

Related U.S. Application Data

(60) Provisional application No. 61/042,164, filed on Apr. 3, 2008.

(51) Int. Cl.
*G02C 7/12* (2006.01)
(52) U.S. Cl. .................................. 351/49; 264/1.32
(58) Field of Classification Search .................... 351/41, 351/44, 49; 264/1.32
See application file for complete search history.

(56) References Cited

U.S. PATENT DOCUMENTS

| 4,049,338 | A | 9/1977 | Slocum |
| 4,989,967 | A | 2/1991 | Matsuda |
| 6,108,131 | A | 8/2000 | Hansen et al. |
| 6,122,103 | A | 9/2000 | Perkins et al. |
| 6,391,528 | B1 | 5/2002 | Moshrefzadeh et al. |
| 7,044,599 | B2 | 5/2006 | Kumar et al. |
| 7,106,507 | B2 | 9/2006 | Lee et al. |
| 7,158,302 | B2 | 1/2007 | Chiu et al. |
| 7,572,006 | B2 * | 8/2009 | Begon et al. ................. 351/163 |
| 2004/0046927 | A1 | 3/2004 | Montgomery |
| 2004/0174596 | A1 | 9/2004 | Umeki |
| 2009/0041971 | A1 * | 2/2009 | Wang et al. .................... 428/54 |

FOREIGN PATENT DOCUMENTS

| DE | 199 64 096 | 7/2001 |
| EP | 2 023 169 | 2/2009 |
| WO | WO 00/07064 | 2/2000 |
| WO | WO 2007/116972 | 10/2007 |

* cited by examiner

*Primary Examiner*—Huy K Mai
(74) *Attorney, Agent, or Firm*—Louis S. Horvath

(57) ABSTRACT

An article of polarized eyewear has a lens with a first substrate lens material transparent to visible light and a pattern of elongated structures formed from at least a second material having a complex index of refraction that is deposited onto a curved surface of the first substrate lens material. The pitch between adjacent elongated structures is less than 300 nm and the width of each elongated structure is less than 90% of the pitch.

24 Claims, 21 Drawing Sheets

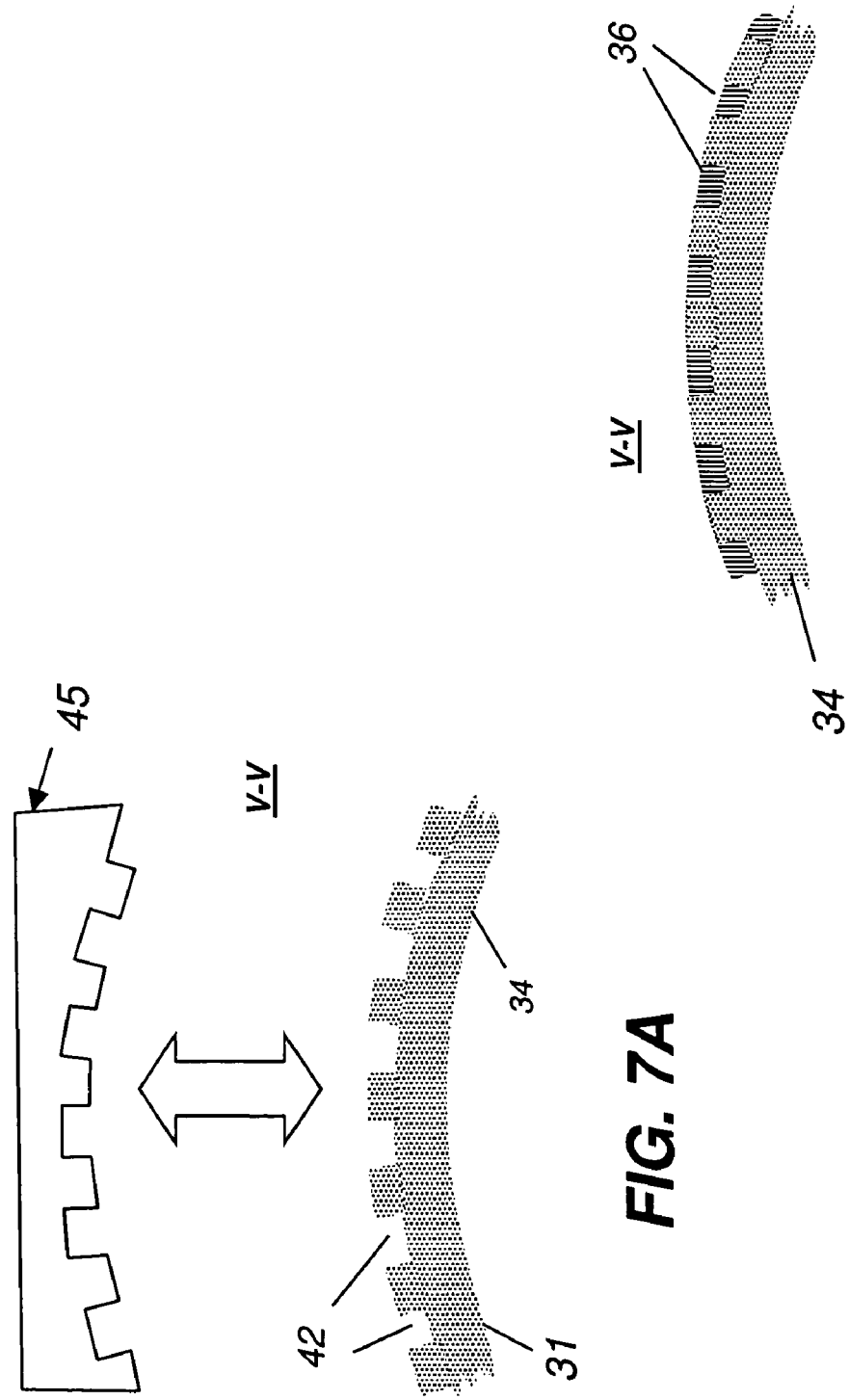

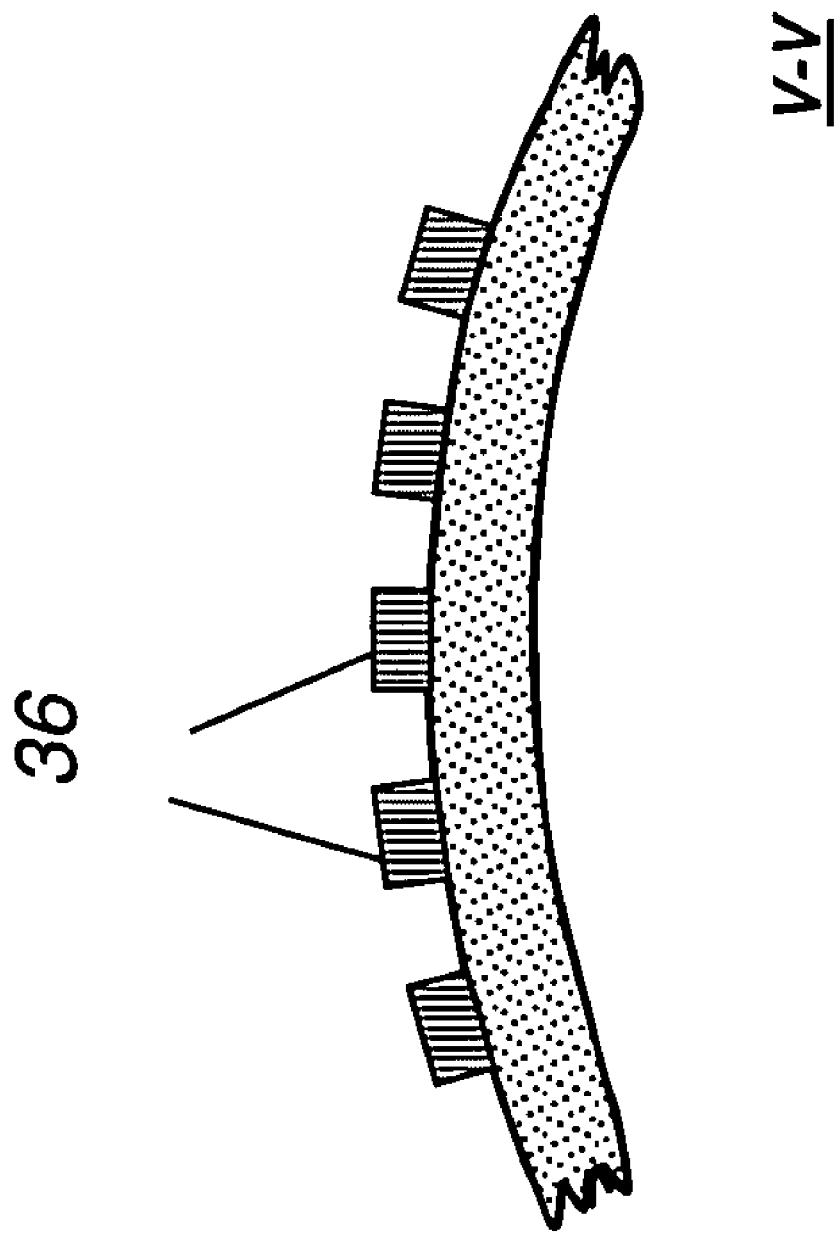

POLARIZED EYEWEAR

CROSS REFERENCE TO RELATED APPLICATIONS

Reference is made to, and priority is claimed from, U.S. Ser. No. 61/042,164 filed as a provisional patent application on Apr. 3, 2008, entitled "Polarized lenses for sunglasses", in the names of Pasquale Matera and David Kessler.

FIELD OF THE INVENTION

The present invention relates generally to sunglasses and other types of eyewear and more particularly relates to polarized eyewear having a well-defined polarization axis.

BACKGROUND OF THE INVENTION

Polarized lenses have been used in sunglasses and other types of eyewear for a number of years and have proved to be of particular value in reducing glare and other potentially irritating effects for the wearer. The conventional fabrication method for polarizer material uses a layering in which a sheet of polarized film material is sandwiched or laminated between outer layers of a glass or plastic. The polarizer material itself is a thin sheet of polymer that has its molecules aligned or oriented, such as by stretching in one direction. Subsequent treatment, such as with dyes and lamination, forms a single axis polarizer sheet that can then be used for sunglasses and other eyewear.

It is known that glare is predominantly horizontally polarized light, since horizontally polarized light reflects much more strongly off a flat surface than does vertically polarized light. Therefore, in order to minimize glare and reduce excessive outdoor brightness, polarizing sunglasses are generally designed to block a higher percentage of horizontally polarized light and transmit a portion of vertically polarized light. Referring to FIG. 1, incoming light from the sun or other bright source impinges on a horizontal object 10 having a top specular surface 11. Surface 11 could be, for example, a thin layer of water covering object 10. Light reflecting off specular surface 11 is glare. The incoming sunlight or other light is unpolarized or randomly polarized light. Light reflected from surface 11 is more highly s-polarized, as represented schematically in FIG. 1; light scattered from object 10 just under top surface 11 is commonly unpolarized. Well-designed polarized eyewear 12, with its polarization transmission axis well-aligned, generally blocks s-polarized light and transmits p-polarized light. For conventional polarized sunglasses, for example, a vertical transmission axis, shown as V in FIG. 1, is most appropriate.

Having a suitable polarization axis, then, helps polarized sunglasses to reduce glare and other effects. However, in practice, maintaining the best polarization axis for viewing through polarized eyewear can be difficult. Certainly, some amount of viewer head movement is inevitable and can be difficult to compensate while maintaining desired polarization. But a more significant problem for maintaining the preferred polarization axis relates to lens shape and sunglass design. Conventional polarizers do not easily adapt to "wrap-around" lens shapes or to more highly curved spherical and "sun-lens" designs. Designs that require more than minimal bending and curving of the polarized plastic and designs with curvature about more than one axis tend to cause inconsistent and non-uniform stretching of the polarizer material and can easily warp and degrade the performance of the polarizer film. Further, fabrication methods such as thermoforming, commonly used to bend and adapt plastic materials to conform to a given shape or curvature, can induce stress into the polarizer material, thereby deforming any parallel molecular pattern that was provided for obtaining polarization in the first place. A stretched pattern of molecules can be warped out of their intended alignment by any type of shaping operation, making the corresponding polarizer less effective, compromising the extinction ratio in an irregular fashion over the lens surface, leading to an inconsistent polarization pattern across the field of view, and even introducing image aberrations and artifacts into the lens. In extreme cases, this effect can be distracting, can lead to image distortion, and might even be hazardous for the viewer.

Yet another problem with conventional polarizer fabrication relates to waste. Because of the nature of handling thin plastic substrates, stretching of the polarizer film itself is a relatively imprecise process that is difficult to control, and the end-product is often subject to non-uniformity. It has proven to be difficult to provide the uniform stress pattern needed for maintaining a polarization axis and relative success or failure may not be known until after fabrication has been completed. This, in turn, leads to reduced yields.

Because of these problems, polarized lens material, available only for designs with limited curvatures, more uniform cylindrical curvatures, and simpler shapes, is often difficult to adapt to eyewear design and consumer tastes. Difficulties in controlling the polarization axis for any particular lens shape constrain the ability of lens designers to take advantages of inherent strengths and benefits of polarizers for the eyeglass wearer.

SUMMARY OF THE INVENTION

It is an object of the present invention to advance the art of polarized eyewear, rejecting unwanted reflected light over the viewer's field of view, particularly where lenses have substantial curvature. With this object in mind, the present invention provides an article of polarized eyewear having a lens wherein the lens comprises:

a first substrate lens material transparent to visible light; and a pattern of elongated structures formed from at least a second material having a complex index of refraction that is deposited onto a curved surface of the first substrate lens material, wherein a pitch between adjacent elongated structures is less than 300 nm and a width of each elongated structure is less than 90% of the pitch.

It is a feature of the present invention that it applies form-birefringence or structured-birefringence to polarized eyewear. The apparatus and method of the present invention provide polarized eyewear having improved absorption and reflection properties for reducing glare and having a number of advantages related to fabrication technique.

It is an advantage of the present invention that it provides polarized eyewear that allows adaptation to highly curved lens designs and is generally more flexible and adaptable than the conventional stretched-substrate polarizer solutions. It is a further advantage of the present invention that it provides polarized eyewear with reduced back reflection due to light from behind the lenses.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 7A, 7B, and 7C show steps in a fabrication sequence for forming an eyeglass lens with a wire-grid polarizer in one embodiment of the present invention.

FIGS. 10A, 10B, and 10C show steps in a fabrication sequence for forming an eyeglass lens with a wire-grid polarizer in another alternate embodiment of the present invention.

DETAILED DESCRIPTION OF THE INVENTION

Figure 1:
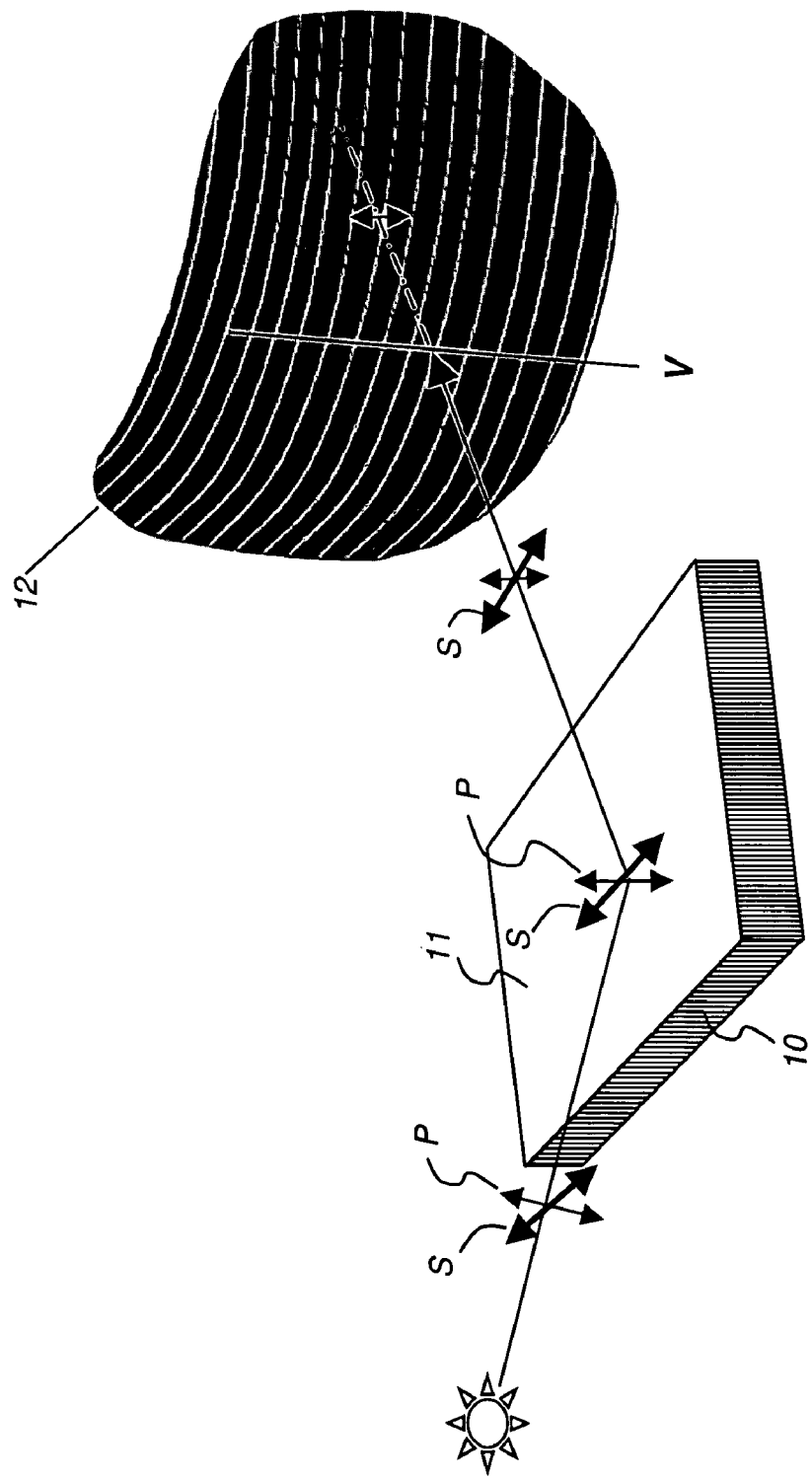
FIG. 1 is a schematic diagram showing the operation of polarized eyewear.

Elements not specifically shown or described may take various forms well known to those skilled in the art. Figures shown and described herein are provided in order to illustrate key principles of operation and component relationships along their respective optical paths or fabrication techniques according to the present invention and are not drawn with intent to show actual size or scale. Some exaggeration may be necessary in order to emphasize basic structural relationships or principles of operation.

In the context of the present disclosure, the term "complex index of refraction" applies where the index of refraction for a material contains both a real component designated commonly as n and a significant imaginary (−i) component, commonly designated as k. Imaginary component k can be considered to be significant where the ratio of k to n satisfies:

$$\frac{k}{n} \geq 0.2$$

For example, metallic aluminum has a complex index of refraction, with its imaginary part k given by k=6.69 and its real part n, given by n=0.96 at wavelength of 500 nm. By contrast, glass and polycarbonate have indices of refraction that are predominantly real, so that the above ratio of k/n is less than 0.2, and would not be considered to be materials having a complex index of refraction. The materials used as a lens substrate in embodiments of the present invention are materials having predominantly real indices of refraction.

In the context of the present disclosure, the term "deposited" refers to any suitable method for applying one material against another and includes practices such as coating, sputtering, forming by growing, chemical vapor deposition, printing, nano-printing, adhesion, electroplating or electroless plating, oxidation, evaporation, sublimation, plasma deposition, anodization, anodic deposition, molecular beam deposition, atomic layer deposition, or photodeposition, for example.

Historically, wire grid polarizers were first developed for polarization of radio waves, then as sub-wavelength gratings for use as polarizers at infrared and higher wavelengths, well above the visible. More recently, advances in photolithography, interference lithography, and other high-resolution fabrication techniques have expanded the usability of wire grid polarizers to visible wavelengths. As one early example, U.S. Pat. No. 5,383,053 entitled "Virtual image display having a high efficiency grid beam splitter" to Hegg et al. discloses a wire grid polarization beam splitter for the visible region in which parallel metal wires have a pitch that is much less than the visible wavelengths and have features in the 150 nm range. More recently, U.S. Pat. No. 6,108,131, entitled "Polarizer apparatus for producing a generally polarized beam of light" to Hansen et al. and U.S. Pat. No. 6,122,103, entitled "Broadband wire grid polarizer for the visible spectrum" to Perkins et al. describe improved-performance wire grid polarizer devices designed for the visible spectrum.

Wire grid polarizers are a type of photonic crystal, wherein a photonic crystal is the broader category of sub-microscopic, periodic dielectric structures that possess spectral gaps (stop bands) for electromagnetic waves, analogous to energy bands and gaps in semiconductors. A few types of photonic crystal are formed in nature; other types are fabricated, such as one-dimensional photonic crystals formed by stacking multiple dielectric layers, such as a Bragg mirror for example. As fabricated, photonic crystals contain regularly spaced regions having alternately higher and lower dielectric constants. Photons, exhibiting wave behavior, may or may not propagate through this structure, depending on factors such as wavelength, spacing between layers, structures, or features, and indices of refraction. Wire grid polarizers themselves operate according to principles of structured birefringence, also termed "form" or "formed" birefringence. The wire grid polarizer is formed as an array of elongated structures or elongated elements, such as fine parallel metallic wires, that are arranged in a plane at a suitable angle to the incident beam.

Figure 2:
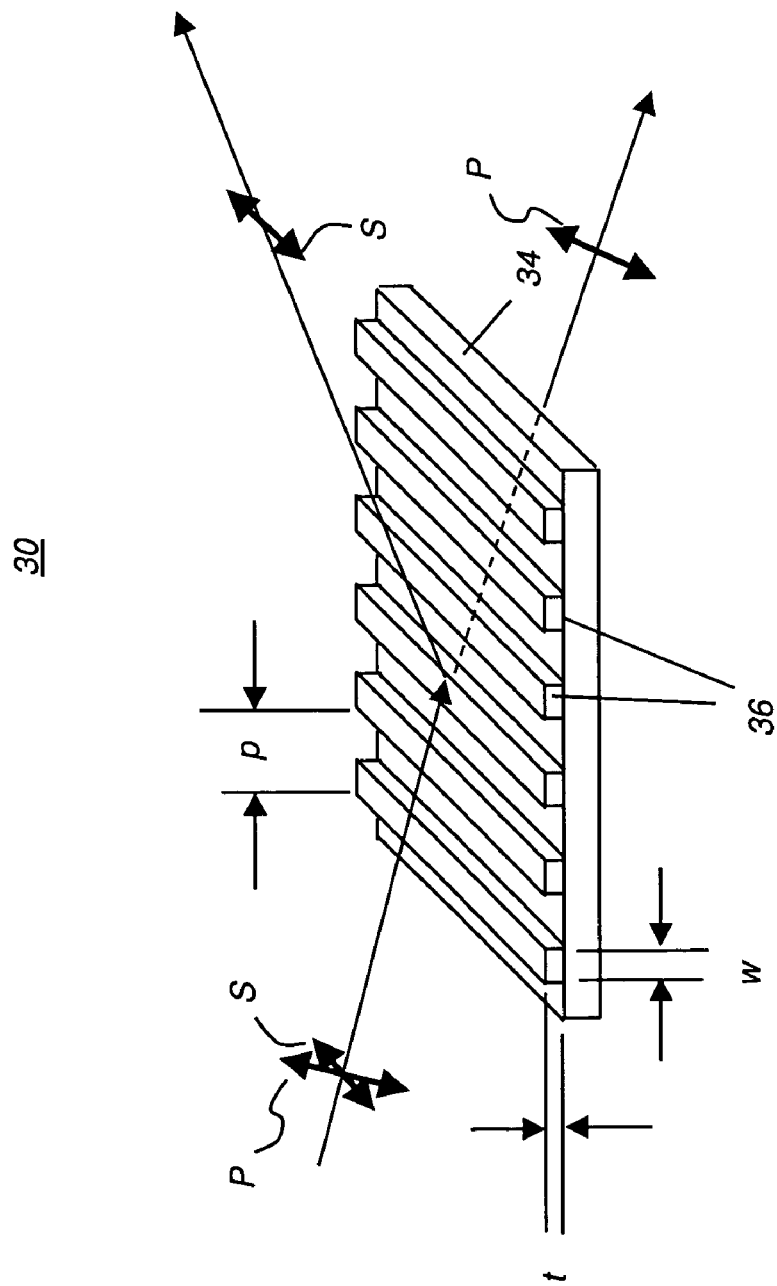
FIG. 2 is a schematic diagram in perspective view of the basic function of a wire grid polarizer with dimensional attributes.

Referring to FIG. 2, the behavior of a wire grid polarizer 30 is shown schematically over a small section of this type of device. Unpolarized light, shown entering at left, is incident on wire grid polarizer 30 and has both s- and p-polarization. Light having s-polarization, with a polarization axis that is parallel to elongated structures 36, is reflected from the surface of wire grid polarizer 30. Light having the orthogonal polarization, shown as p-polarization in FIG. 2, is transmitted through a transparent substrate 34.

Figure 3:
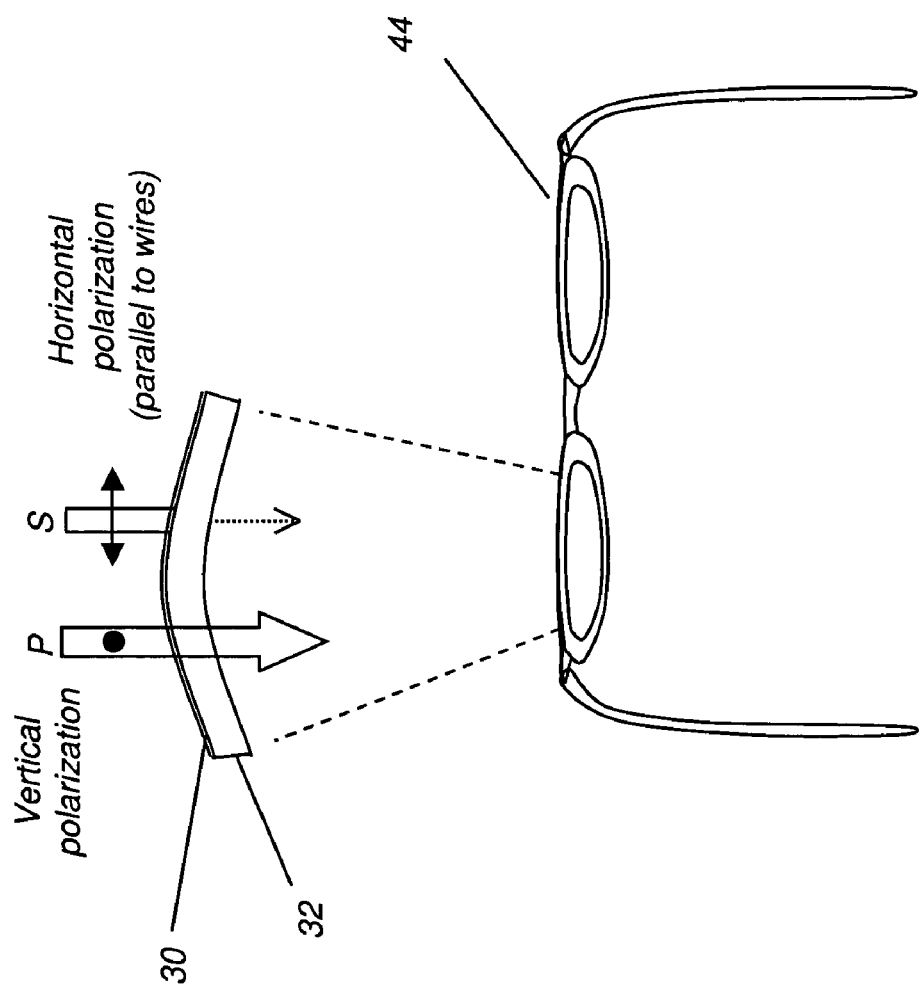
FIG. 3 shows a top view of a lens in a polarized eyewear apparatus in one embodiment and its effect on transmitting the vertical polarization and reducing the horizontal polarization.

The schematic top view of FIG. 3 shows the function of a wire grid polarizer 30 in an eyeglass lens 32 for eyeglasses 44. Here, wire grid polarizer 30 reflects a substantial portion of the s-polarized light that has its polarization axis parallel to the horizontally oriented elongated structures or wires and transmits the bulk of the orthogonal p-polarized light with its axis of polarization in the vertical direction.

Dimensions of Interest

There are a number of dimensional parameters that, when satisfied, allow wire grid polarizer 30 operation, in the manner of a photonic crystal, over the visible range. The perspective cross-sectional view of FIG. 2 shows dimensional requirements that are of particular interest for wire grid polarizer operation:

(i) Pitch p or the period between wires, or more broadly, between adjacent elongated structures 36 must be half the wavelength of the incident visible light, or less than half this wavelength. For conventional sunglass and other eyeglass applications, this means preferably between about 140 to 180 nm, but more generally within the range between about 100 and 300 nm. Near a threshold value of about 300 nm, the polarizer begins to exhibit undesirable grating-like properties, with a portion of the light diffracting into the grating orders. This diffraction effect would potentially create undesirable ghost images perceptible to the wearer of the polarized eyeglasses.

(ii) Width w of elongated structures 36 should be less than 90% of the pitch, more preferably within about 50 to 90 nm.

(iii) Thickness t of elongated structures 36 above the surface of substrate 34 should be within about 70 to 160 nm.

It is also instructive to note that adjacent elongated structures 36 have a segment-wise parallel relationship, in which two or more adjacent elongated structures or equivalent surface features extend in a parallel direction along at least some portion of their length. Elongated structures 36 that form the wire grid may be continuous, extending in unbroken lines across the full surface of the lens. Alternately, one or more elongated structures 36 may be segmented, with a slight gap between segments. In yet other embodiments, elongated structures 36 are composite structures having aligned particles with a suitably elongated shape, as described in subsequent discussion of materials. Elongated structures 36 can alternately have some wavelike form with small deviations from being strictly parallel to one axis of polarization. Adjacent elongated structures are discrete with respect to the width w direction, with a gap between any two adjacent elongated structures.

Materials and Structure of Elongated Structures

Conventional wire grid polarizers are formed using a parallel arrangement of thin aluminum strips that extend across the polarizer surface, generally using a glass substrate. Embodiments of the present invention can also use aluminum or other metals for elongated structures 36. Some of the other metals that have been used for wire grid polarizers include gold, platinum, chromium, nickel, copper, silver, and tungsten, for example, and other metals such as rhodium may also offer advantages. Metals such as these have complex indices of refraction, as defined earlier, which makes these materials particularly well-suited for use in wire grid polarizers.

Figure 4:
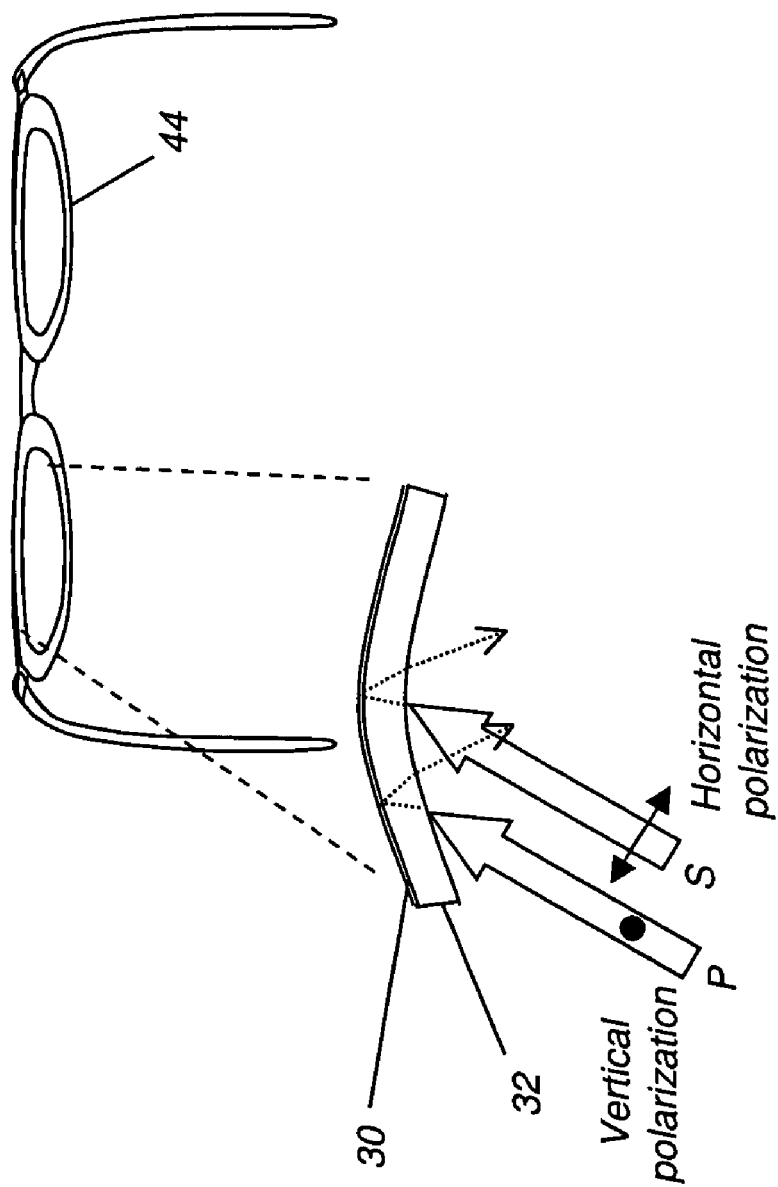
FIG. 4 is a top view of a lens in a polarized eyewear apparatus, showing the effect of reducing the back reflection in both the vertical and horizontal polarizations.

While reflective metals are often used for conventional wire grid devices, however, there can be problems of backreflection when these are employed on eyeglass surfaces. Referring to FIG. 4, possible paths for light reflected from the eye or otherwise incident from the rear of lens 32, such as light reflected from the viewer's eyes or face, are shown. Anti-reflection (AR) coatings can be used for reducing this back-reflected light somewhat. However, because metallic wires can be highly reflective, additional steps for reducing back-reflection may be needed.

Figure 5A:
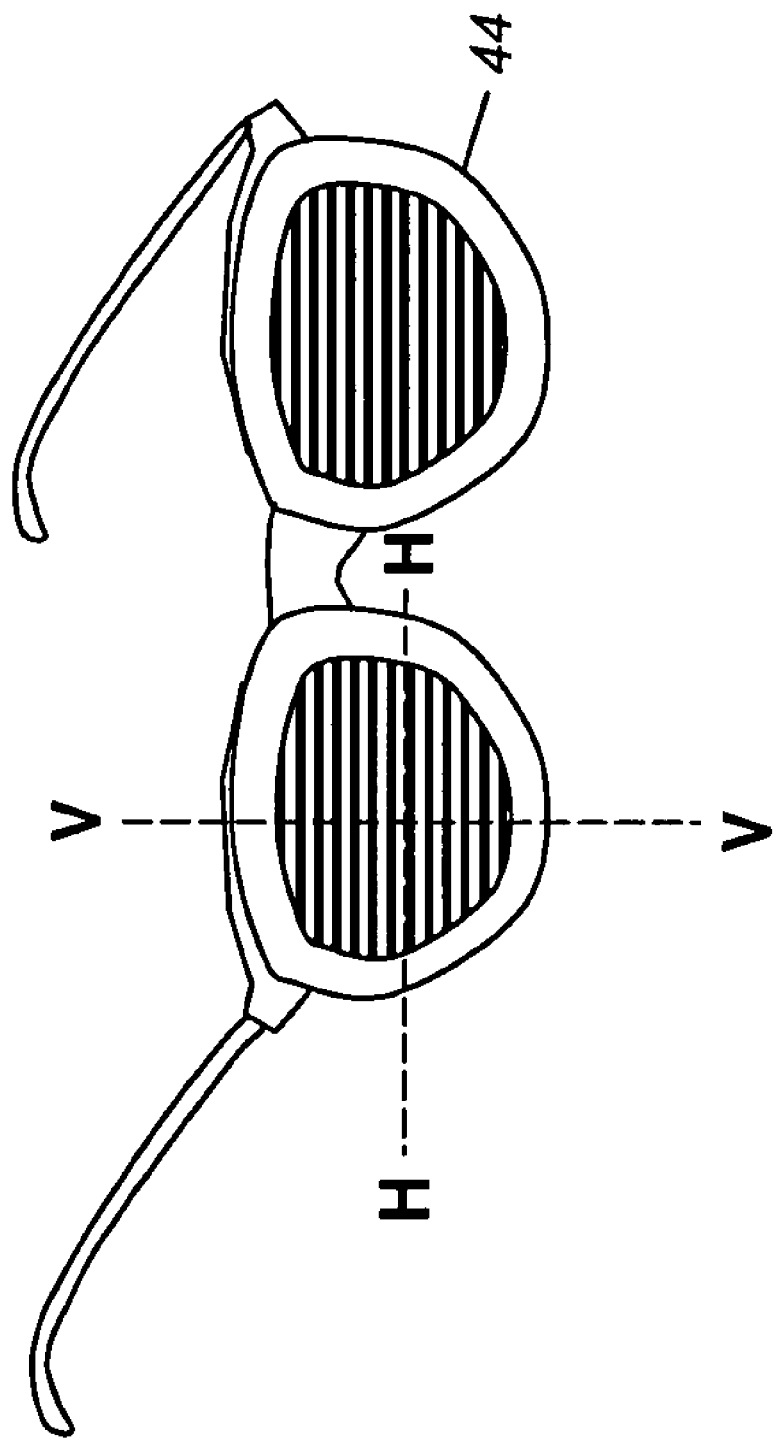
FIG. 5A shows the eyewear with reference directional cross sections in the horizontal and vertical directions.
Figure 5B:
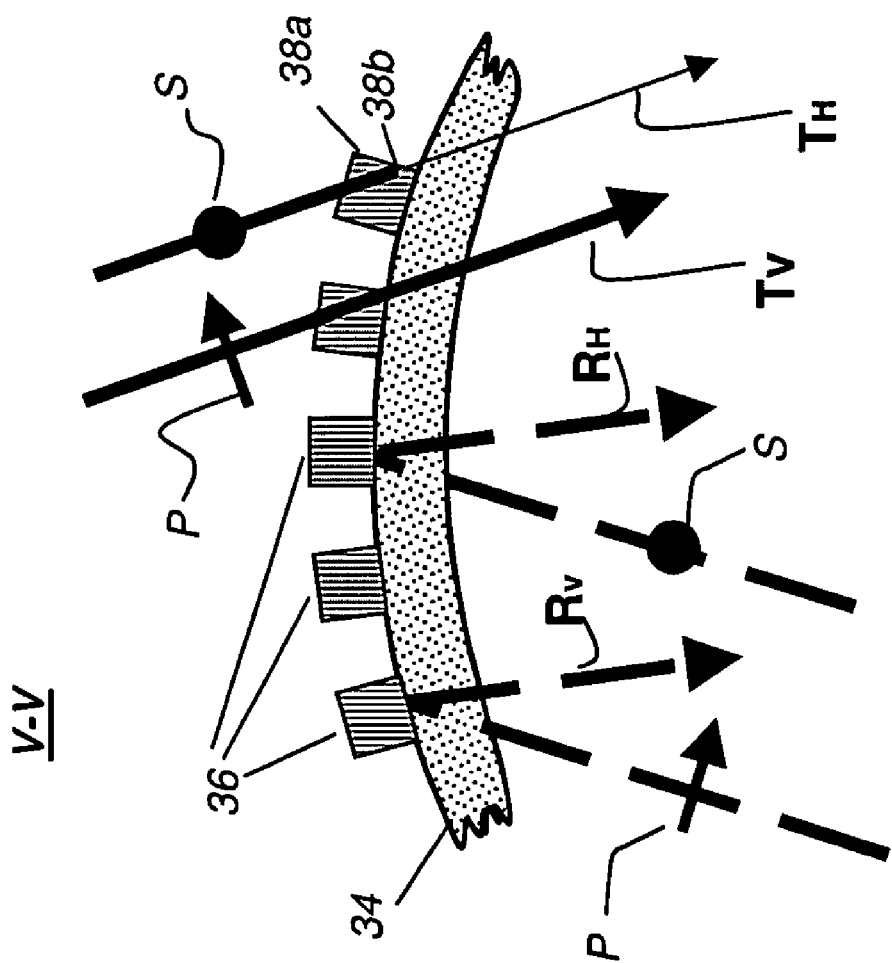
FIG. 5B is a vertical cross-sectional view of elongated structures forming a wire grid polarizer on a curved substrate with the transmitted and reflected light shown.
Figure 5C:
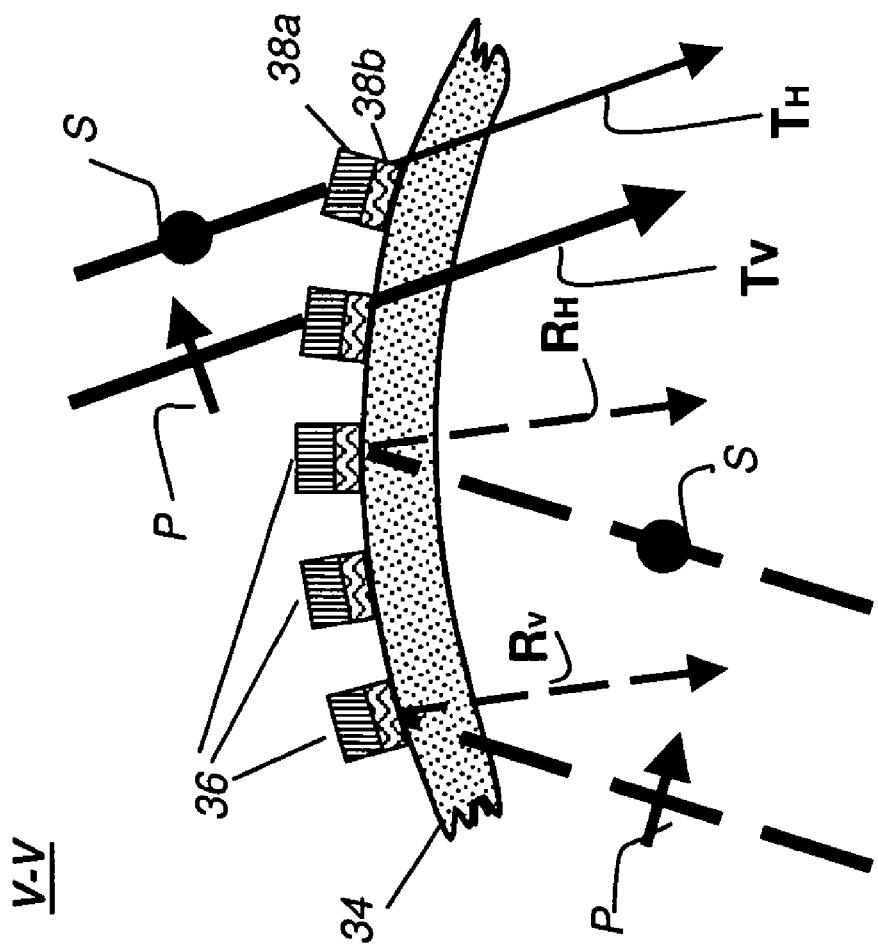
FIG. 5C shows a vertical cross sectional view of a double stack wire grid according to one embodiment, formed on a curved substrate with the transmitted and reflected light shown.

Elongated structures 36 (FIG. 2) can alternately be formed from a combination of materials, wherein at least one of the materials has a complex index of refraction, as defined earlier. Referring to the reference coordinates in FIG. 5A and the cross sections of FIGS. 5B, 5C, 5D and 5E, various embodiments using elongated structures 36 are shown. Substrate 34 in FIGS. 5B through 5E is a curved substrate according to a main aspect of this invention. FIG. 5B shows an embodiment in which elongated structures 36 are formed from a single material, such as aluminum or other metal. FIG. 5C shows an alternate embodiment in which each elongated structure 36 is formed as a composite, with stacked layers 38a and 38b of different materials. In one embodiment, for example, layer 38a is aluminum and layer 38b is carbon. The carbon layer 38b absorbs incident light, making it particularly advantageous for reducing back-reflection.

FIGS. 5B and 5C show a number of values, as follows:

$T_V$ is the transmission value of the vertically polarized light which is designed to be the largest of the transmission values shown, depending on the desired optical density of the eyeglass lens.

$T_H$ is the transmission for the light polarized in the horizontal direction, which is designed to be as low as possible for glare reduction.

$R_H$ and $R_V$ are the values for undesirable reflected light that is incident from the viewer side, polarized in the horizontal and vertical directions correspondingly. These reflections should be minimized.

Figure 5E:
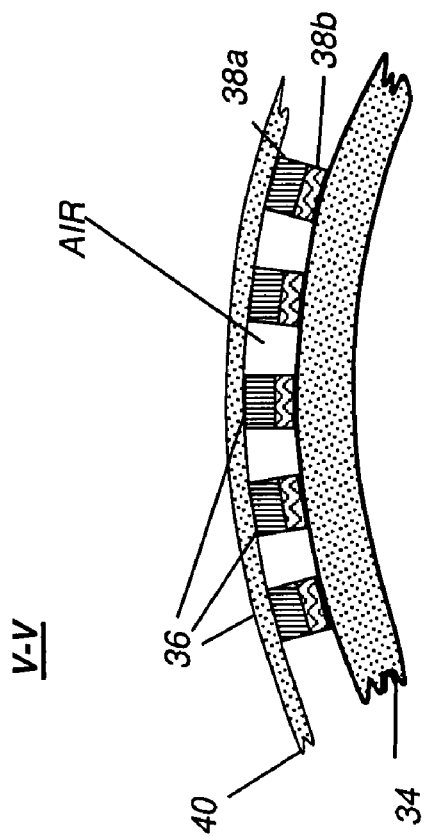
FIG. 5E is a cross sectional view of a wire grid polarizer protected with a cover film with air trapped between the elongated structures according to another embodiment of the present invention.
Figure 5D:
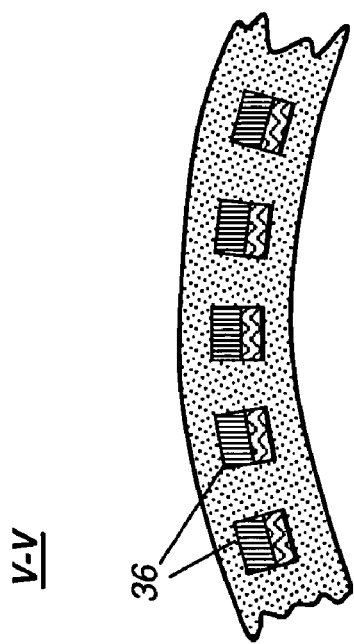
FIG. 5D shows a vertical cross sectional view of an embedded wire grid polarizer

In order to prevent contamination from dirt, fingerprints, airborne particles, and other sources, elongated structures 36 can be coated, embedded, encased, or otherwise shielded from exposure. In one embodiment, as shown in FIG. 5D, a coating of an optical polymer such as PMMA is used to fully encase elongated structures 36. This fills interstitial spaces, the gaps between elongated structures 36. In an alternate embodiment, as shown in FIG. 5E, elongated structures 36 are sandwiched between lens surfaces, but without interstitial material. In the FIG. 5E embodiment, a transparent layer 40 is provided for covering elongated structures 36. Air or other gas, or a very low index material such as an aerogel, fills the spaces between elongated structures 36. This arrangement is advantaged because it allows a larger pitch between elongated structures 36, due to the low index of refraction of air. This allows for easier fabrication of elongated structures 36.

Figure 5F:
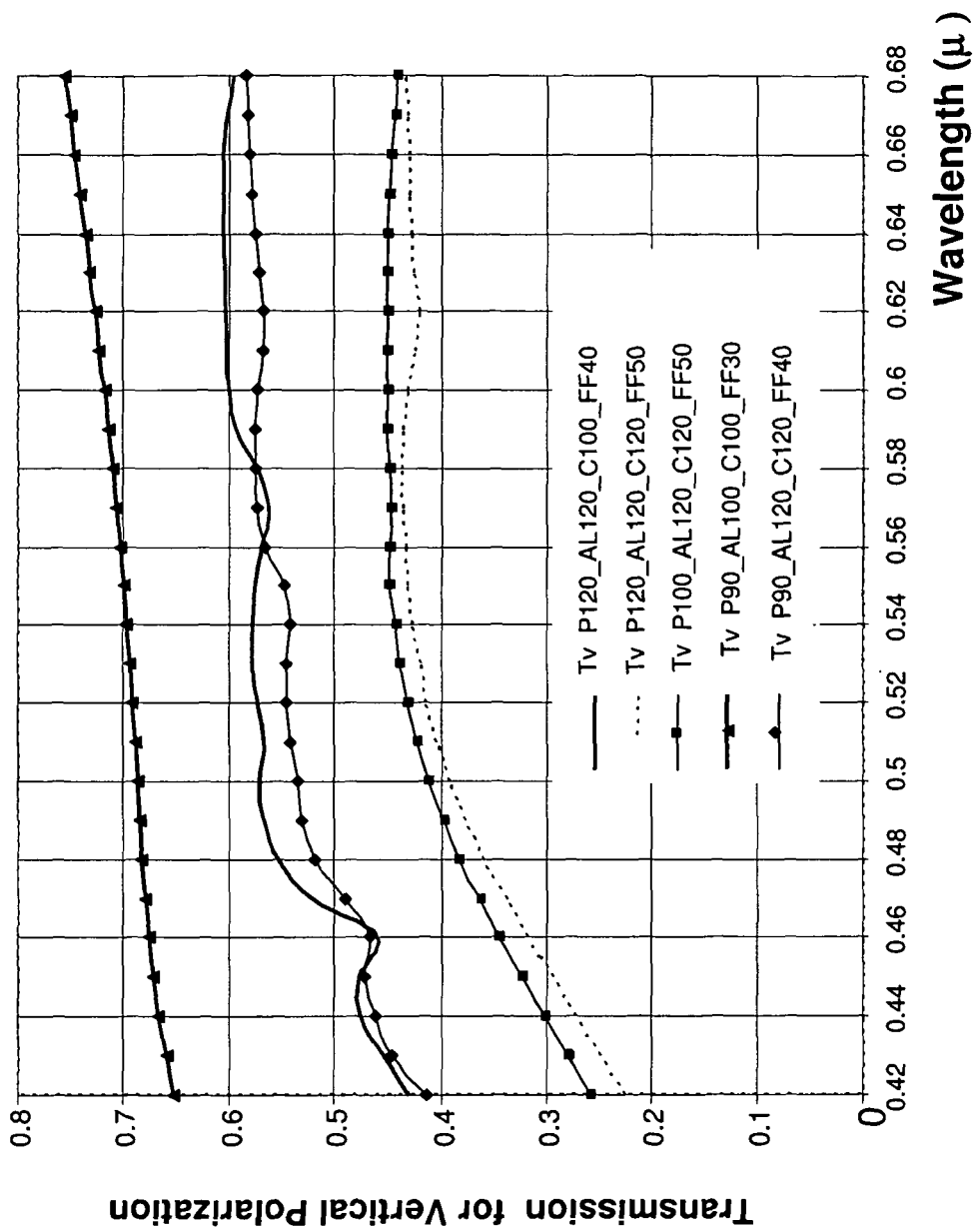
FIG. 5F is a graph that relates transmission for vertically polarized light to wavelength for an embodiment having the arrangement of FIG. 5C.
Figure 5G:
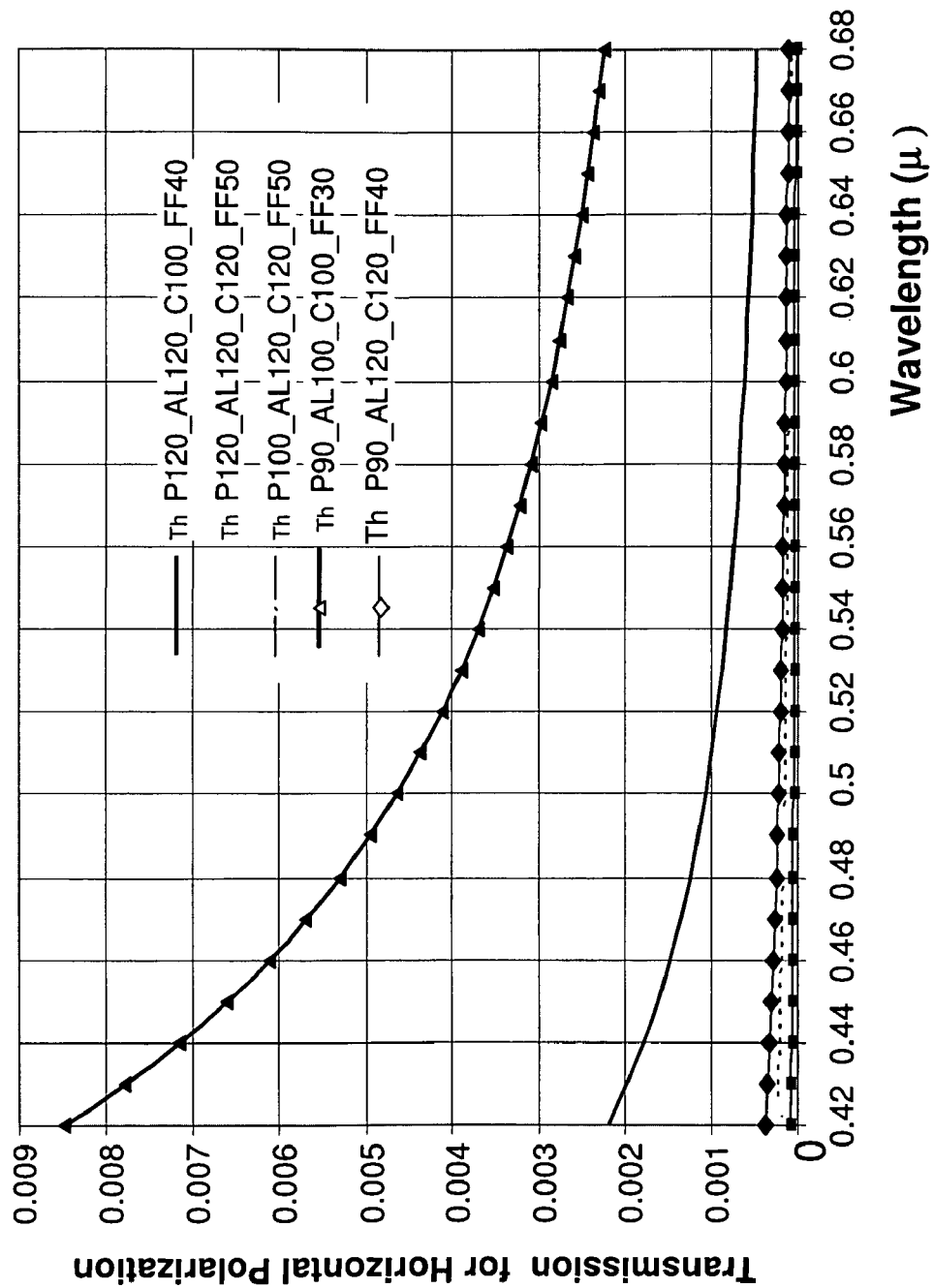
FIG. 5G is a graph that relates transmission for horizontally polarized light to wavelength for an embodiment having the arrangement of FIG. 5C.
Figure 5H:
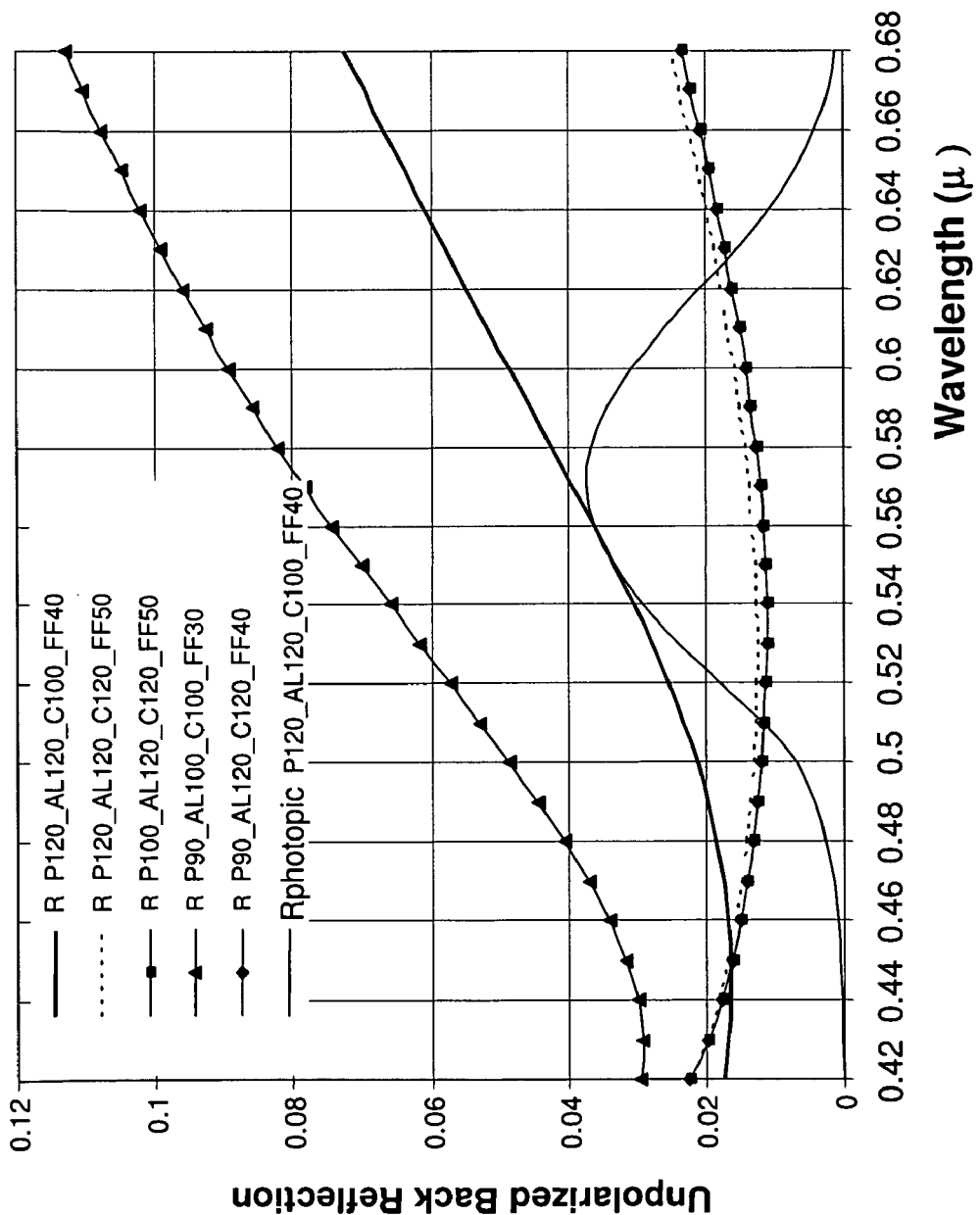
FIG. 5H is a graph that relates unpolarized back reflection to wavelength for an embodiment having the arrangement of FIG. 5C.

The performance of the polarizer depends on the choice of parameters such as layer thicknesses, pitch of the elongated structures, choice of materials, and the fill factor, namely the ratio of the width of the elongated structures to the pitch. Using different parameters allows the polarizer to have different spectral transmission curves, different visual transmission characteristics, and different polarization extinction ratios. FIG. 5F shows the performance of different polarization configurations in terms of transmission of the vertical polarization for the embedded polarizer of FIG. 5D. The substrate and the embedding material is CR-39 and the stack is an aluminum-carbon stack. The 5 curves in FIG. 5F show the transmission for $T_V$ over a range of visible wavelengths for different layer structures as derived using a commercially available rigorous diffraction grating analysis program. Each of the configurations is designated by the pitch (P) in nm, the thickness of the aluminum layer (AL) in nm, the thickness of the carbon layer (C) in nm and the fill factor (FF). Thus, as an example, the designation P90_AL_120_C_100_FF40 means pitch of 90 nm, aluminum thickness of 120 nm, carbon thickness of 100 nm and fill factor (or duty factor) of 40%. The designation P120_AL100_C100_FF40 has a pitch of 120 nm, aluminum thickness of 100 nm, carbon thickness of 100 nm, and fill factor of 40%. The graph of FIG. 5G shows corresponding transmission for unwanted $T_H$ for an embodiment with the arrangement of FIG. 5D with different design parameters of polarizers made of carbon and aluminum stack embedded in CR-39 plastic. The graph of FIG. 5H shows the performance of the polarizers in terms of their ability to block unwanted back reflections. FIG. 5H shows unpolarized back reflection over a range of visible wavelengths using the embodiment of FIG. 5D with different design parameters of polarizers made of carbon and aluminum stack embedded in CR-39 plastic. Only one number is used which is the summation of the reflection in both the horizontal and vertical direction. The Rphotopic curve shows reflection weighting according to the photopic response of the eye.

Other embodiments of the present invention employ more complex layered arrangements and a variety of different materials. As just one example, a layered arrangement with two or more alternating elongated metal and dielectric layers can be deposited to form wire grid polarizer 30, with an arrangement such as that described in U.S. Pat. No. 6,788,461 entitled "Wire Grid Polarizer" to Kurtz et al.

Embodiments of the present invention that use aligned particulates deposited on substrate 34 to form elongated structures 36 offer a number of advantages, particularly with respect to weight and ease of fabrication. Referring back to the discussion of structure dimensions relative to FIG. 2, elongated and axially aligned particles, such as silver and copper particles, can also be arranged with a suitable pitch p, thickness t, and width w for providing the appropriate polarization.

Figure 6:
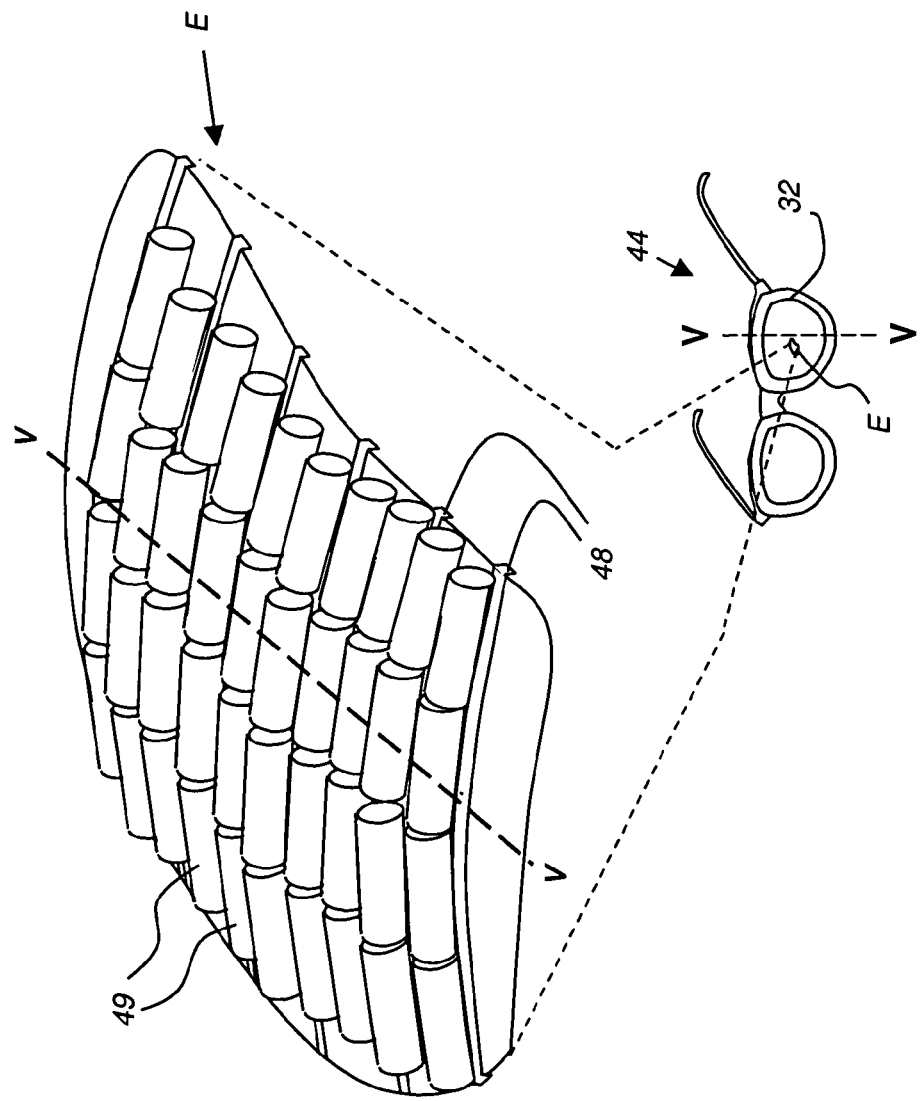
FIG. 6 is a partially enlarged, perspective view of another embodiment where the polarizer is made of nanotubes made of complex index materials and aligned on a curved grooved substrate.

Referring to FIG. 6, an alternate embodiment of the present invention uses a polarizer that is fabricated using elongated structures that are formed by depositing an arrangement of elongated nano-particles 49, aligned along alignment grooves 48 on lens substrate 32, as shown over enlarged area E in FIG. 6. Alignment grooves 48 or, alternately, protrusions (not shown), can have a pitch dimension that is substantially larger than the wavelength of light, simplifying fabrication. Elongated nano-particles 49, formed of a material having a complex index of refraction, are aligned to the grooves 48 and also are self-aligned to each other. In one embodiment, elongated nano-particles 49 are Carbon Nano Tubes (CNT), and materials having similar refractive index properties could also be used. Alignment grooves 48 are formed to be generally perpendicular to the vertical direction V shown.

Fabrication Methods

Figure 7C:
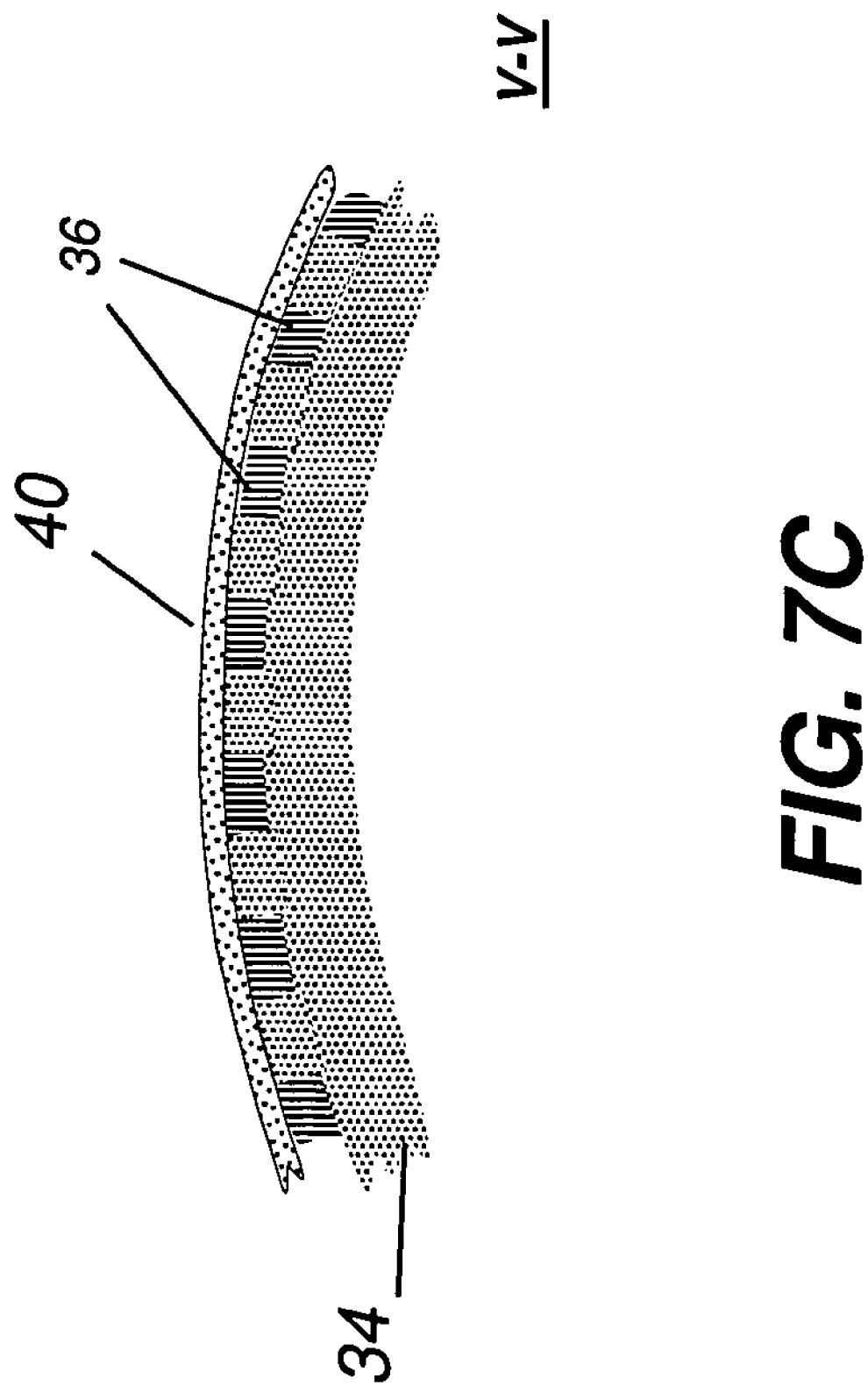

In one embodiment, elongated structures 36 are formed by nano-printing onto the lens surface. Alternately, elongated structures 36 can be formed by molding or micromachining as shown in the sequence of cross-sectional side views in the vertical direction in FIGS. 7A, 7B, and 7C. In this embodiment, channels 42 are formed in the surface of a lens 31, formed of substrate 34 using a stamping tool or mold 45, as shown in FIG. 7A. Channels 42 are then filled with a material having a complex refractive index, as shown in FIG. 7B, thereby forming elongated structures 36. In one embodiment, solvent-coating is used as the filling process. Alternately, vacuum deposition is used, employing shade masking, a method familiar to those skilled in the microlithographic fabrication arts. In an embodiment using nanotubes or other particulate materials, as was described earlier with reference to FIG. 6, the materials are aligned within alignment grooves 48 during the filling or coating process. As shown in FIG. 7C, a coating or film layer 40 is optionally applied in order to protect the outer surface of the array of elongated structures 36.

Advantageously, the wire grid structure of the present invention can be formed onto lens substrate 34 either before or after the lens is shaped. The wire grid structure can also be deposited by being applied adhesively or otherwise bonded to the lens surface before or after being shaped. Elongated features 36 can be formed on the outer (convex) surface of the eyeglass lens or on the inner (generally concave) surface.

Figure 8:
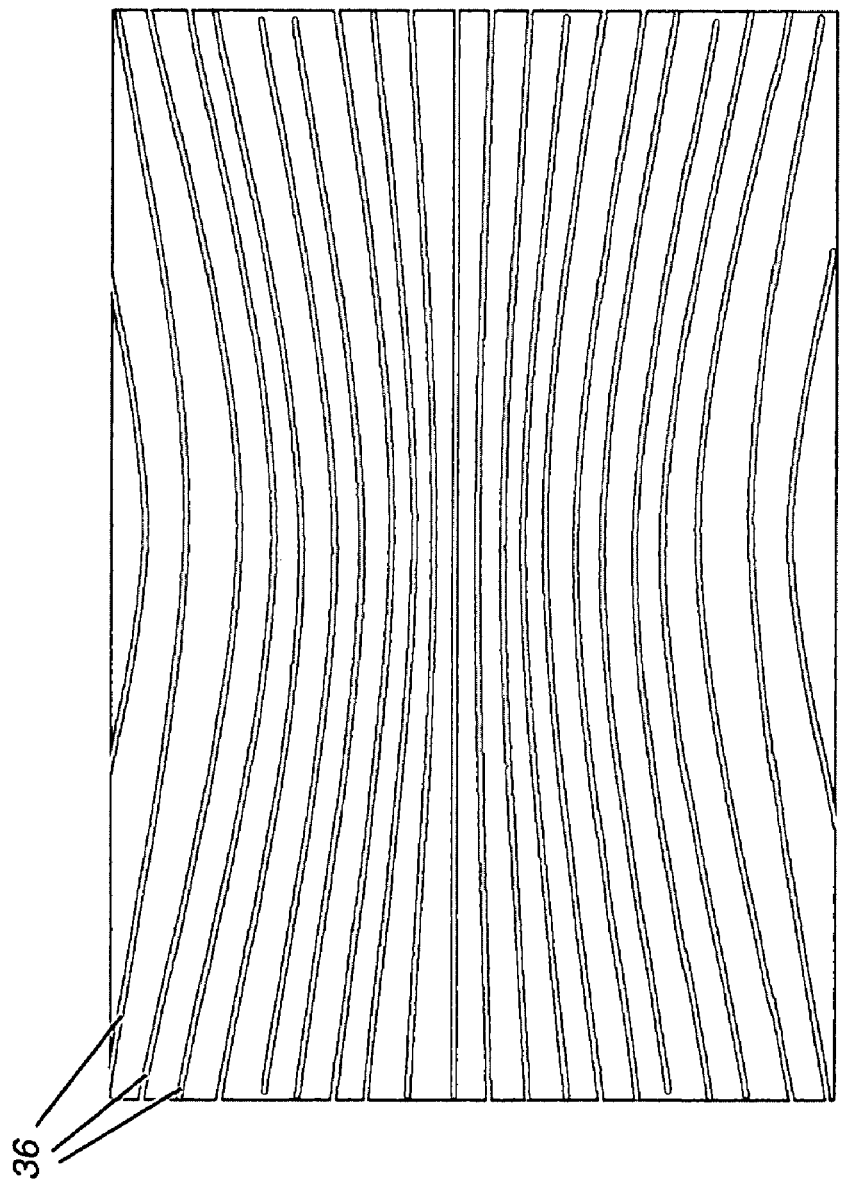
FIG. 8 shows a pattern of elongated structures used to compensate for bending of the lens surface in one embodiment.

In one embodiment, as shown in the plan view of FIG. 8, the array of elongated structures 36 is itself formed in a pattern that corrects or compensates for the anticipated bending and shaping of the lens substrate. Then, when substrate 34 is formed into its curved shape, each line of elongated structures 36 aligns to have the desired horizontal or other orientation. The arrangement of FIG. 8 can be formed onto substrate 34 itself or onto a laminate layer that is bonded to substrate 34 during some stage of eyewear fabrication.

Figure 9A:
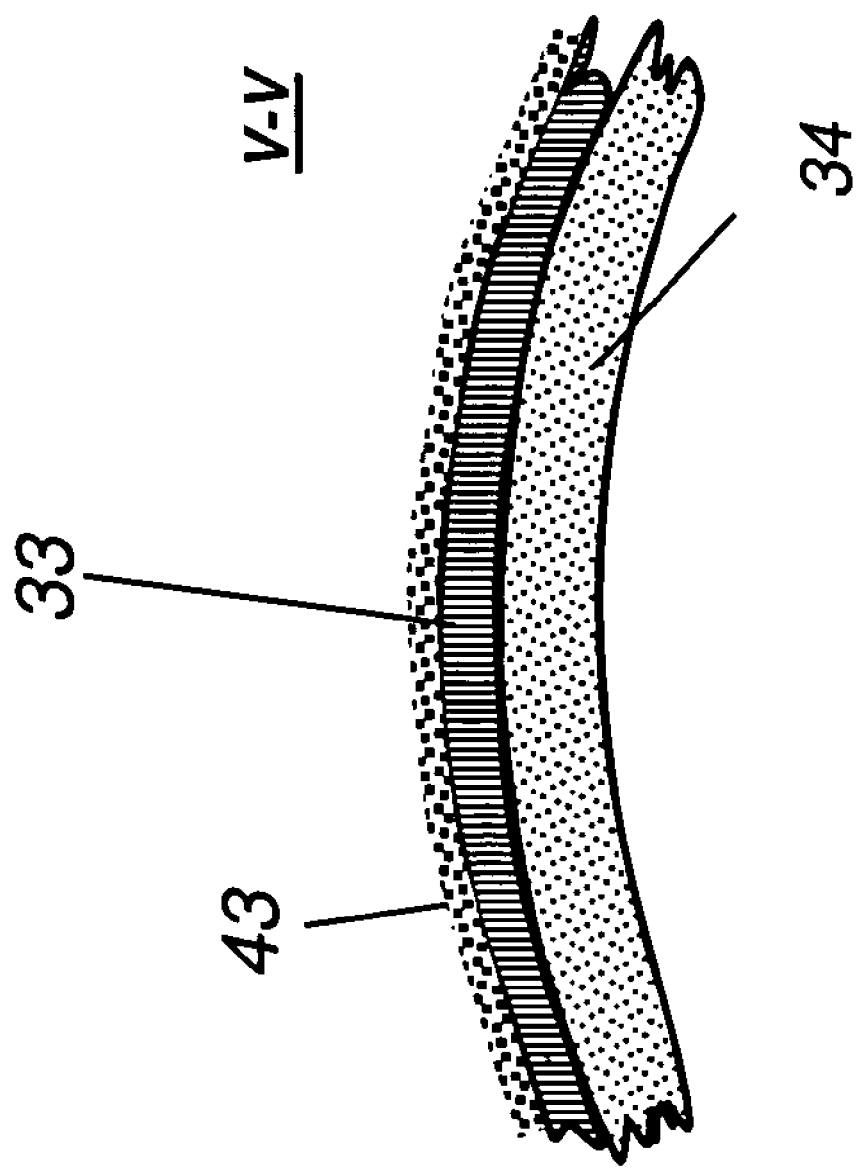
FIGS. 9A, 9B, and 9C and show steps in a fabrication sequence for forming an eyeglass lens with a wire-grid polarizer in an alternate embodiment of the present invention.
Figure 9B:
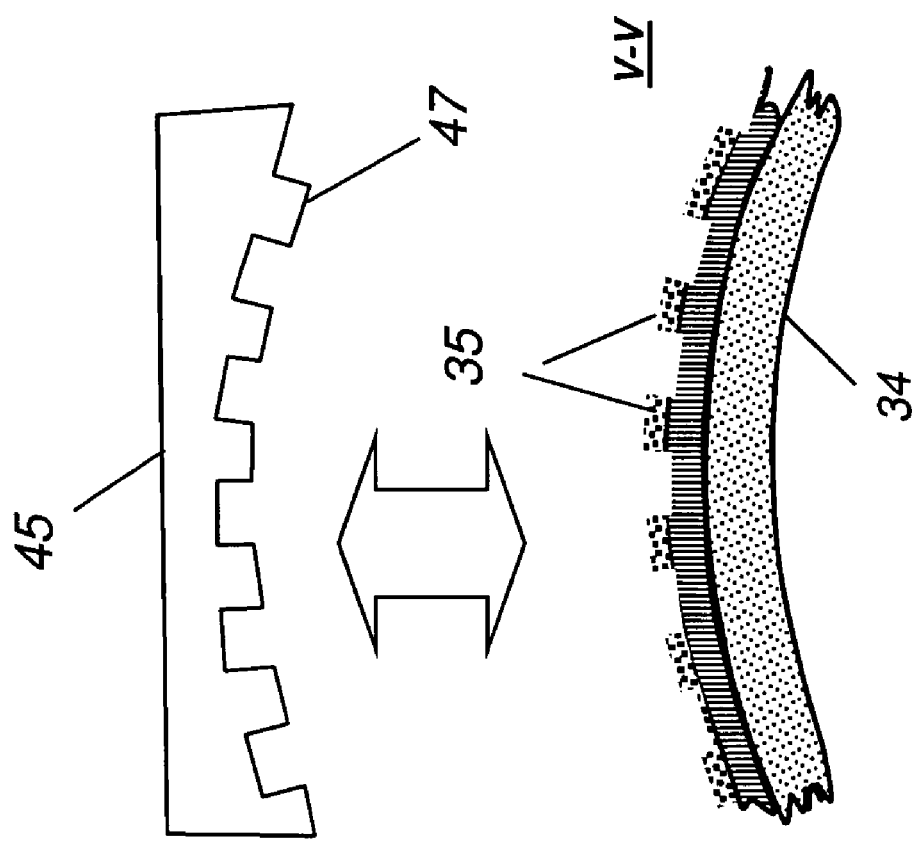
Figure 9C:
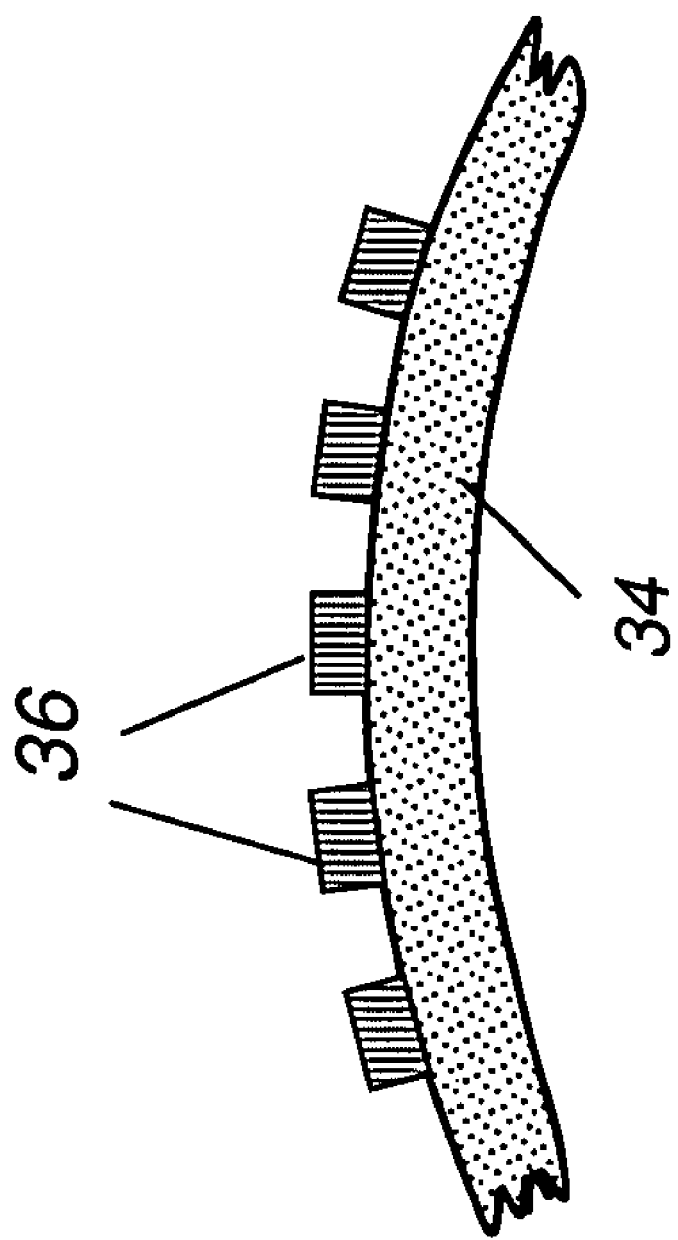

In another embodiment, as shown in FIGS. 9A, 9B, and 9C, substrate 34 itself is first pre-coated with layer 33 which can be aluminum, carbon, or other material having a complex index of refraction. Layer 33 is then coated with a polymer or monomer layer 43. A stamping tool or mold 45 having microstructures 47 is used to remove a pattern of layer 43 material and thus impart elongated structures 35 onto the surface of substrate 34 as shown in FIG. 9B. An etching process is then used to form elongated structures 36 of the complex index material as shown in FIG. 9C. The polymer is a low viscosity photoresist material that is then cross-linked after stamping to improve the hardness of the material prior to etching.

Figure 10B:
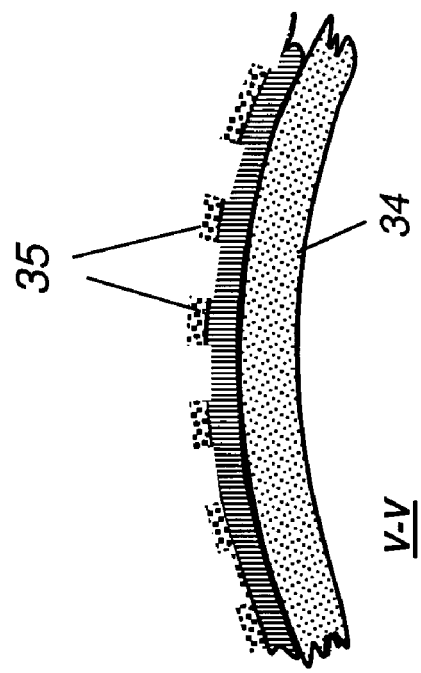
Figure 10A:
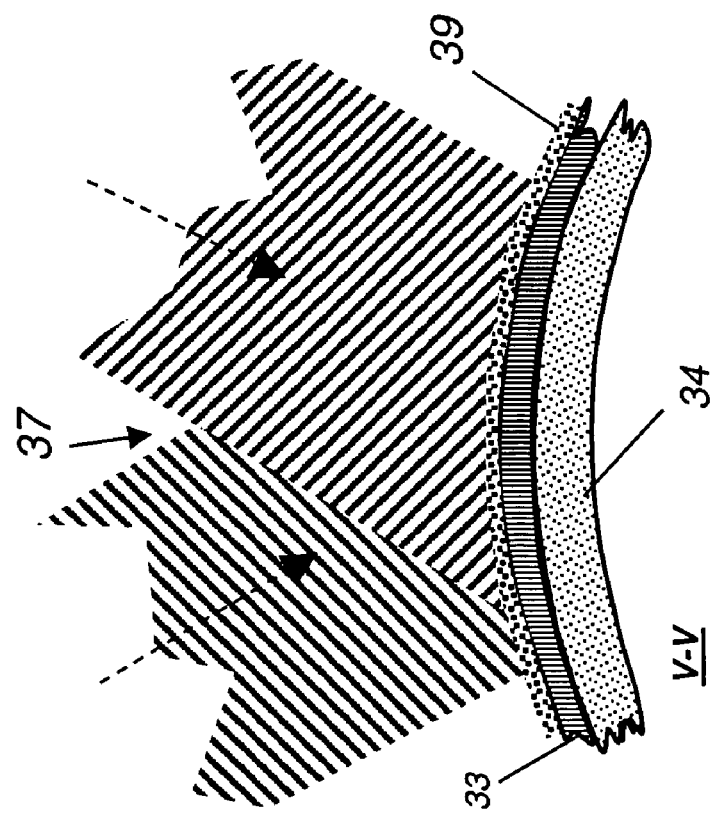

In yet another embodiment, as shown in FIGS. 10A, 10B, and 10C, an etching process is used to form the array of elongated structures 36 directly onto the curved glass or plastic lens surface. The basic steps of this process include the following:

1) Deposit an initial coating. One or more thin layers 33 of material having a complex index of refraction are coated or otherwise deposited onto the lens substrate 34. In one embodiment, a single material, aluminum, is used. In another embodiment, multiple layers are deposited, with the first layer that is deposited being carbon or other highly light-absorbent material for reducing back-reflection, as described earlier with reference to FIG. 5C.
2) Deposit a photoresist layer 39 onto the initial coating. This material can be a conventional photoresist material used for photolithographic etching, for example.
3) Expose a pattern for the array of elongated structures 36 into the photoresist material. This pattern can be from a mask or using interference 37 from two lasers as shown in FIG. 10A, or by scanned light beam or suitable projection optics such as one using Talbot imaging or holographic imaging. Exposure can be from UV, excimer lasers, or other short wavelength radiation.

4) Develop the photoresist and prepare the exposed surface for etching as shown in FIG. 10B.

5) Apply etching material and perform the etching process to form the elongated structures 36 as shown in FIG. 10C.

Multi-Zone Polarizer

Unlike conventional methods for forming polarizing films by stretching, the fabrication methods for the wire grid polarizer of the present invention not only allow the polarizer to be formed onto a curved glass or plastic surface, such as using the etching procedure just described, but also allow a large measure of control over polarization axes at different positions along the lens surface. The earlier discussion relative to FIG. 1 indicated that the preferred orientation of polarization transmission is vertical, blocking horizontally polarized light. While this is the case for many conventional sunglass applications, there can be applications for which it is advantageous to have different polarization zones within the same lens surface.

Figure 11:
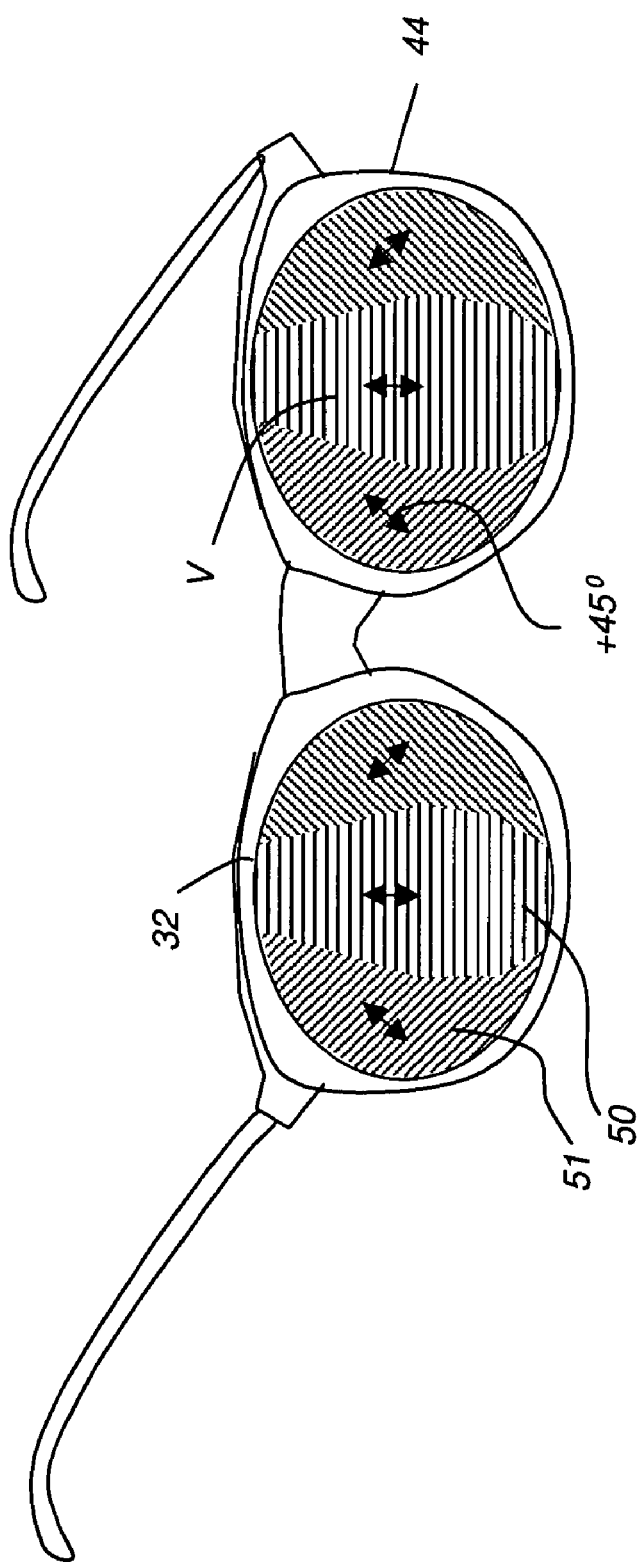
FIG. 11 is a plan view of polarized eyeglasses having a plurality of different polarization transmission axes.

Referring to FIG. 11, there is shown an arrangement of eyewear 44 that takes advantage of the capability for zoned polarization afforded by the present invention. For each lens, an area about the center of the field of view 50 has a horizontal polarization axis. However, moving toward each outer edge of the lens 32, to zone 51 the polarization axis is shifted from horizontal. This arrangement can have benefits for polarized eyewear in specialized applications, such as for flight equipment or where the source of reflected glare is not from a horizontally disposed reflective surface, for example.

The apparatus and methods of the present invention can provide polarized eyewear that maintains a desired transmission axis of polarization at any point along the lens. The exceptional degree of control over polarization that is afforded by wire grid polarizers helps to yield more precise and efficient polarizing filters and allows the design of "wrap-around" surfaces having a high degree of curvature. The polarizer of the present invention does not introduce aberrations or distortion and can be used with conventional sunglasses, prescription eyeglasses, contact lenses, goggles and protective eye- or face-shields, windshields and protective glass in cockpits, and other eyeglass apparatus. Because it can be produced to provide polarization to a high degree of accuracy, the polarized eyewear of the present invention can be fabricated with less waste than is generated when manufacturing conventional polarized eyeglass materials.

The polarizer of the present invention can be used in combination with other non-polarizing layers, including those containing dyes or pigments.

Polarized eyeglasses formed according to the present invention can be designed to tune reflection suitably for light of different wavelengths. This capability can help, for example, to reduce the level of infrared or heat radiation that is transmitted through the lens. As has been noted, changes to the structure of elongated structures 36 can also help to reduce the effects of reflected light received from behind the lens.

It is also well understood that the polarizer eyewear according to this invention can be used with or combined with common vision correction glasses. Thus substrate 34 of the polarizing lens could be a vision correction lens.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, any of a number of different materials could be employed for lens 32, including photochromic or transitional materials, or for elongated structures 36. Any of a number of methods could be used for depositing one or more materials having a complex index of refraction onto lens substrate 34.

Thus, what is provided is a method and apparatus for providing polarized eyewear having a well-defined polarization axis.

PARTS LIST

10. Object
11. Surface
12. Polarized eyewear
30. Wire grid polarizer
31. Lens
32. Lens
33. Layer
34. Substrate
35. Elongated masking structure
36. Elongated structure
37. Interference
38a, 38b. Layer
39. Photoresist layer
40. Layer
42. Channel
43. Layer
44. Eyeglasses
45. Mold
47. Microstructure
48. Groove
49 Elongated nano particle
50, 51. Zone
p. Pitch
t. Thickness
w. Width
V. Transmission axis (vertical)

The invention claimed is:

1. An article of polarized eyewear having a lens, wherein the lens comprises:
    a first substrate lens material transparent to visible light; and
    a pattern of elongated structures formed from at least a second material having a complex index of refraction, wherein the second material is deposited directly onto a curved surface of the first substrate lens material, wherein a pitch between adjacent elongated structures is less than 300 nm and a width of each elongated structure is less than 90% of the pitch and wherein the pattern of elongated structures forms a polarizer across the curved surface that provides a substantially vertical polarization transmission axis.

2. The article of claim 1 further comprising a coating formed over the pattern of elongated structures.

3. The article of claim 1 wherein the elongated structures are formed from one or more of aluminum, copper, silver, carbon, titanium, platinum, gold, chromium, rhodium, and nickel.

4. The article of claim 1 wherein one or more of the elongated structures is formed as a layer of metal over a layer of a light-absorbing material.

5. The article of claim 1 wherein the elongated structures are embedded within a polymer.

6. The article of claim 1 wherein the elongated structures are formed of elongated nanoparticles.

7. The article of claim 1 wherein the first substrate lens material is a polymer.

8. The article of claim 1 wherein the first substrate lens material is glass.

9. The article of claim 1 wherein the elongated structures have a thickness above the curved surface that is within about 70 to 160 nm.

10. The article of claim 1 wherein the elongated structures are formed on an inner surface of the lens, facing a viewer who wears the eyewear.

11. The article of claim 1 wherein the elongated structures are segment-wise parallel.

12. The article of claim 1 wherein the elongated structures are sandwiched between two lens surfaces.

13. A method for fabricating polarized eyewear comprising:

providing a first substrate lens material having a predominantly real index of refraction; and forming a pattern of segment-wise parallel elongated structures onto a surface of the first substrate lens material, wherein each elongated structure is formed from at least a second material having a complex index of refraction; and shaping the first substrate lens material to provide one or more curved surfaces and to align the pattern of segment-wise parallel elongated structures according to a polarization axis, wherein the pitch between adjacent elongated structures after shaping is less than 300 nm and the width of each elongated structure is less than 90% of the pitch.

14. The method of claim 13 wherein forming the pattern of elongated structures comprises depositing one or more layers of at least the second material and etching the one or more layers.

15. The method of claim 13 wherein forming the pattern of elongated structures comprises depositing at least the second material using nano-printing.

16. The method of claim 13 wherein forming the pattern of elongated structures comprises impressing a stamp against a surface of the first substrate lens material.

17. The method of claim 13 further comprising applying a protective coating onto the pattern of elongated structures.

18. The method of claim 13 wherein forming the pattern of elongated structures comprises aligning one or more particulate materials into channels formed on the surface of the first substrate lens material.

19. The method of claim 13 wherein forming the pattern of elongated structures comprises depositing a light-absorbing material in a first layer directly onto the first substrate lens material.

20. The method of claim 13 wherein forming the pattern of elongated structures comprises providing an interference pattern from a pair of laser light sources.

21. The method of claim 13 wherein forming the pattern of elongated structures comprises depositing nanotubes into channels formed in the lens surface.

22. The method of claim 13 wherein forming the pattern of segment-wise parallel elongated structures further comprises compensating for changes to pattern alignment according to anticipated shaping of the first substrate lens material.

23. A method for fabricating polarized eyewear comprising:

providing a first substrate lens material that is transparent to visible light;

forming a pattern of elongated structures onto a surface of the first substrate lens material, wherein each elongated structure is formed from at least a second material having a complex index of refraction;

wherein the pitch between adjacent elongated structures is less than 300 nm and the width of each elongated structure is less than 90% of the pitch; and curving the first substrate lens material into a shape that brings the elongated structures into a segment-wise parallel relationship and substantially maintains a polarization azimuth over the curved shape.

24. The method of claim 23 wherein curving the first substrate lens material further comprises bonding the first substrate lens material to a curved substrate lens material.

* * * * *